(12) United States Patent
Kim et al.

(10) Patent No.: US 10,166,968 B2
(45) Date of Patent: Jan. 1, 2019

(54) METHOD FOR CONTROLLING COASTING DRIVE OF ENVIRONMENTALLY FRIENDLY VEHICLE

(71) Applicants: Hyundai Motor Company, Seoul (KR); Kia Motors Corporation, Seoul (KR)

(72) Inventors: Do Hee Kim, Gyeonggi-do (KR); Jaekyu Hyun, Daegu (KR); Kyu Hwan Jo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 63 days.

(21) Appl. No.: 15/602,817

(22) Filed: May 23, 2017

(65) Prior Publication Data

US 2018/0170347 A1 Jun. 21, 2018

(30) Foreign Application Priority Data

Dec. 15, 2016 (KR) .......................... 10-2016-0171931

(51) Int. Cl.
| | |
|---|---|
| *B60W 30/00* | (2006.01) |
| *B60W 20/11* | (2016.01) |
| *B60W 20/12* | (2016.01) |
| *B60W 30/18* | (2012.01) |

(52) U.S. Cl.
CPC ............ *B60W 20/11* (2016.01); *B60W 20/12* (2016.01); *B60W 30/18072* (2013.01); *B60W 2520/10* (2013.01); *B60W 2550/142* (2013.01); *B60W 2720/10* (2013.01)

(58) Field of Classification Search
None
See application file for complete search history.

(56) References Cited

U.S. PATENT DOCUMENTS

| | | | | |
|---|---|---|---|---|
| 9,694,687 | B2* | 7/2017 | Woo ................... | B60W 50/0097 |
| 2008/0090697 | A1* | 4/2008 | Ortmann ............... | B60K 6/365 |
| | | | | 477/15 |
| 2011/0054768 | A1* | 3/2011 | Sullivan ................ | B60W 10/06 |
| | | | | 701/123 |
| 2014/0067225 | A1* | 3/2014 | Lee .................... | B60W 50/0097 |
| | | | | 701/93 |
| 2015/0088349 | A1* | 3/2015 | Akashi .................. | B60W 10/08 |
| | | | | 701/22 |
| 2015/0151760 | A1* | 6/2015 | Kim ....................... | F16D 48/06 |
| | | | | 701/67 |

(Continued)

*Primary Examiner* — Jonathan M Dager
(74) *Attorney, Agent, or Firm* — Mintz Levin Cohn Ferris Glovsky and Popeo, P.C.; Peter F. Corless

(57) ABSTRACT

A method for controlling a coasting drive of an environmentally friendly vehicle includes: calculating a coasting velocity of the environmentally friendly vehicle at a deceleration event point based on a target coasting distance up to the deceleration event point and a gradient at the deceleration event point; calculating a control target velocity of the environmentally friendly vehicle based on a target velocity of the environmentally friendly vehicle at the deceleration event point and the calculated coasting velocity; and determining control torque to adjust a velocity of the environmentally friendly vehicle to the target velocity to be output to a powertrain of the environmentally friendly vehicle based on the calculated control target velocity.

10 Claims, 12 Drawing Sheets

(56) References Cited

U.S. PATENT DOCUMENTS

| | | | |
|---|---|---|---|
| 2016/0101780 A1* | 4/2016 | Park | B60W 50/0097 701/70 |
| 2016/0121898 A1* | 5/2016 | Jo | B60W 50/0097 701/22 |
| 2016/0167641 A1* | 6/2016 | Yoon | B60W 20/13 701/22 |
| 2016/0347294 A1* | 12/2016 | Hyun | B60T 7/22 |
| 2018/0065620 A1* | 3/2018 | Eo | B60W 20/15 |
| 2018/0149212 A1* | 5/2018 | Huh | B60K 6/387 |
| 2018/0162234 A1* | 6/2018 | Kim | B60L 15/2009 |
| 2018/0162397 A1* | 6/2018 | Eo | B60W 20/15 |
| 2018/0222483 A1* | 8/2018 | Yoon | B60W 30/18072 |

* cited by examiner

METHOD FOR CONTROLLING COASTING DRIVE OF ENVIRONMENTALLY FRIENDLY VEHICLE

CROSS-REFERENCE TO RELATED APPLICATION

This application claims under 35 U.S.C. § 119(a) the benefit of Korean Patent Application No. 10-2016-0171931 filed in the Korean Intellectual Property Office on Dec. 15, 2016, the entire contents of which are incorporated herein by reference.

BACKGROUND

(a) Technical Field

The present disclosure relates to a method for controlling a vehicle, more particularly, to a method for controlling a coasting drive of an environmentally friendly vehicle.

(b) Description of the Related Art

Environmentally friendly vehicles include a fuel cell vehicle, an electric vehicle, a plug-in electric vehicle, and a hybrid vehicle, and generally have a motor for generating driving force.

The hybrid vehicle, which is one example of the environmentally friendly vehicle, uses both an internal combustion engine and battery power. That is, the hybrid vehicle efficiently combines and uses motive power of the internal combustion engine and the motive power of the motor.

The hybrid vehicle may include an engine, the motor, an engine clutch controlling the motive power between the engine and the motor, a transmission, a differential gear device, a battery, a starter and a generator starting the engine or generating power by an output of the engine, and wheels.

Further, the hybrid vehicle may be constituted by a hybrid control unit controlling all operations of the hybrid vehicle, an engine control unit controlling the operation of the engine, a motor control unit controlling the operation of the motor, a transmission control unit controlling the operation of the transmission, and a battery control unit controlling and managing the battery.

The battery control unit may be called a battery management system. The starter and generator may also be called an integrated starter & generator (ISG) or a hybrid starter & generator (HSG).

The hybrid vehicle may be driven in drive modes including an electric vehicle mode (EV mode) which is a pure electric vehicle mode using only the motive power of the motor, a hybrid electric vehicle mode (HEV mode) using rotary force of the motor as an auxiliary motive power while using the rotary force of the engine as a main motive power, and a regenerative braking mode collecting braking and inertia energy while driving by braking or inertia of the vehicle.

The above information disclosed in this Background section is only for enhancement of understanding of the background of the disclosure and therefore it may contain information that does not form the prior art that is already known in this country to a person of ordinary skill in the art.

SUMMARY

The present disclosure provides a method for controlling a coasting drive of an environmentally friendly vehicle, which improves precision of inertial drive control on a downhill road and increases a regenerative energy amount by using regenerative braking of the environmentally friendly vehicle to charge regenerative energy on the downhill road to contribute to improvement of fuel efficiency.

An example embodiment of the present disclosure provides a method for controlling a coasting drive of an environmentally friendly vehicle, including: calculating, by a control unit, a coasting velocity of the environmentally friendly vehicle at a deceleration event point based on a target coasting distance up to the deceleration event point and a gradient at the deceleration event point; calculating, by the control unit, a control target velocity of the environmentally friendly vehicle based on a target velocity of the environmentally friendly vehicle at the deceleration event point and the calculated coasting velocity; and determining, by the control unit, control torque to adjust a velocity of the environmentally friendly vehicle to the target velocity to be output to a powertrain of the environmentally friendly vehicle based on the calculated control target velocity.

The method may further include determining, by the control unit, whether a residual distance up to the deceleration event is equal to or less than the target coasting distance, wherein when the residual distance is equal to or less than the target coasting distance, calculating the coasting velocity of the environmentally friendly vehicle is performed.

The method may further include controlling, by the control unit, a distance calculating unit to calculate the target coasting distance based on the target coasting distance based on a type of the deceleration event, the target velocity, and a gradient transmitted from a navigation apparatus.

The controlling of the control torque to be output to the powertrain of the vehicle may include controlling, by the control unit, a torque output unit to output feed forward torque stored in a map table, which is control torque corresponding to the control target velocity and a current velocity of the environmentally friendly vehicle.

The controlling of the control torque to be output to the powertrain of the vehicle may include outputting, by the control unit, feedback torque corresponding to the control torque based on a vehicle velocity difference which is a difference between the current velocity and the control target velocity of the environmentally friendly vehicle.

The controlling of the control torque to be output to the powertrain of the vehicle may include controlling, by the control unit, a torque output unit to output the feed forward torque stored in the map table, which corresponds to the current velocity and of the environmentally friendly vehicle and the control target velocity, outputting, by the control unit, the feedback torque corresponding to the control target velocity based on the vehicle velocity difference which is the difference between the current velocity and the control target velocity, controlling, by the control unit, an adjustment factor output unit to adjust an application ratio of the feed forward torque stored in the map table, which corresponds to the vehicle velocity difference and the residual distance up to the deceleration event, and controlling, by the control unit, a final control torque output unit to calculate final control torque corresponding to the control torque based on the output feed forward torque and feedback torque and the adjusted application ratio and output the calculated final control torque to the powertrain.

In the case of an adjustment factor output by the adjustment factor output unit and to adjust the application ratio, as the residual distance increases and the vehicle difference increases, the application ratio of the feed forward torque may increase.

The control unit may control the feed forward torque to be output before outputting the feedback torque based on the adjustment factor output by the adjustment factor output unit and to adjust the application ratio and control the feed forward torque and the feedback torque to be mixed and used and thereafter, control the feedback torque to be output when the vehicle approaches a position corresponding to the deceleration event.

The final control torque may be calculated by the Equation: $\alpha*FF\ tq.+(1-\alpha)*FB\ tq.$, wherein the $\alpha$ may represent the adjustment factor output by the adjustment factor output unit and to adjust the application ratio, the FF tq. may represent the feed forward torque, and the FB tq. may represent the feedback torque.

A non-transitory computer readable medium containing program instructions executed by a processor includes: program instructions that calculate a coasting velocity of an environmentally friendly vehicle at a deceleration event point based on a target coasting distance up to the deceleration event point and a gradient at the deceleration event point; program instructions that calculate a control target velocity of the environmentally friendly vehicle based on a target velocity of the environmentally friendly vehicle at the deceleration event point and the calculated coasting velocity; and program instructions that determine control torque to adjust a velocity of the environmentally friendly vehicle to the target velocity to be output to a powertrain of the environmentally friendly vehicle based on the calculated control target velocity.

According to an exemplary embodiment of the present disclosure, since a method for controlling a coasting drive of an environmentally friendly vehicle determines a deceleration control target velocity (alternatively, deceleration control torque) by predicting a permissible maximum coasting velocity through a geometric law and a physical law, recovering regenerative energy can be maximized Since a gradient and an altitude of a deceleration target point (or road) and an energy conservation law are used, a regenerative braking amount can be easily determined.

Since a deceleration control target velocity is controlled on a downhill road, precision of inertia drive control can be improved.

BRIEF DESCRIPTION OF THE DRAWINGS

A brief description of each drawing is provided in order to more sufficiently appreciate drawings used in a detailed description of the present disclosure.

DETAILED DESCRIPTION OF THE EMBODIMENTS

Figure 1:
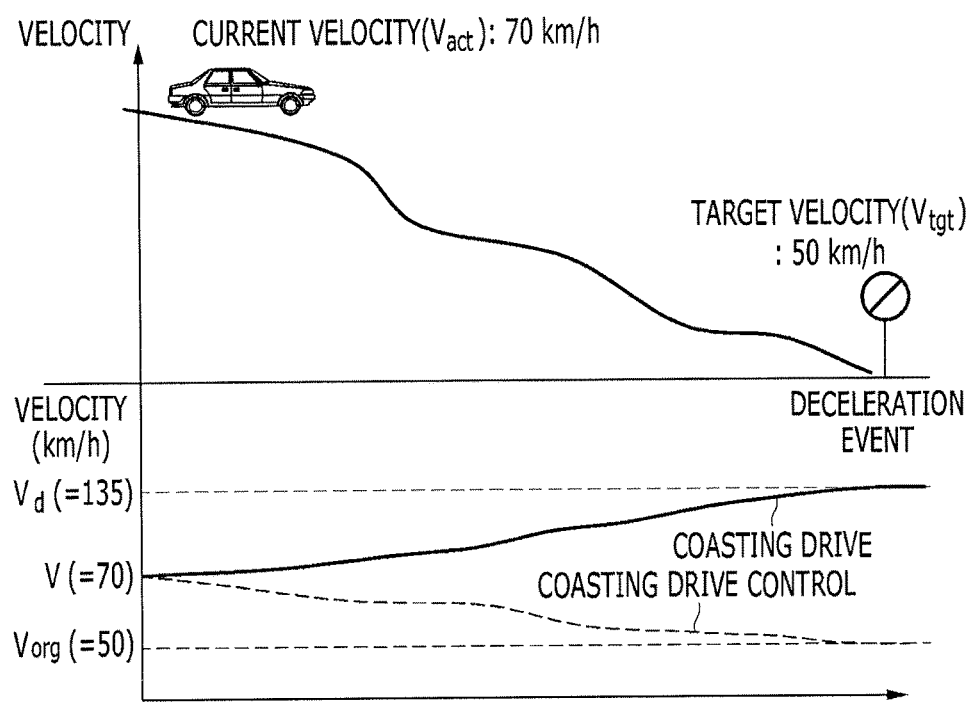
FIG. 1 is a schematic diagram for describing a downhill road coasting drive situation of an environmentally friendly vehicle.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In order to sufficiently appreciate objects achieved by the present disclosure and exemplary embodiments of the present disclosure, accompanying drawings illustrating the exemplary embodiments of the present disclosure and contents disclosed in the accompanying drawings should be referred.

Hereinafter, exemplary embodiments of the present disclosure will be described in detail by describing the present disclosure with reference to the accompanying drawings. In the following description, a detailed explanation of known related technologies may be omitted to avoid unnecessarily obscuring the subject matter of the present disclosure. Like reference numerals presented in each drawing may refer to like elements.

Terms used in the present specification are used only to describe specific exemplary embodiments, and are not intended to limit the present disclosure. A singular form may include a plural form if there is no clearly opposite meaning in the context. In the present specification, it should be understood that the term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

Throughout the present specification and the claims that follow, when it is described that a part is "coupled" to another part, the part may be "directly coupled" to the other part or "electrically or mechanically coupled" to the other part through a third component.

A drive situation using a 3D high-precision map may be predicted with the development of IT technology, and as a result, precision of vehicle control may be improved. In particular, an environmentally friendly vehicle including a motor may improve the precision of the vehicle control by using rapid responsiveness of the motor and contribute to improvement of real road fuel efficiency by using regenerative energy of the motor.

FIG. 1 is a schematic diagram for describing a downhill road coasting drive situation of an environmentally friendly vehicle.

In the case where a deceleration event (e.g., a velocity camera, a safe velocity, a congestion of a road, etc.,) exists after a downhill road, when a coasting drive (a drive by inertia of a vehicle without stepping on either an acceleration pedal or a braking pedal) is performed without separate control, a velocity of the vehicle may increase for example, from 70 km/h to 135 km/h.

In the case of the environmentally friendly vehicle, energy may be recovered through regeneration by a motor on the downhill road. In order to maximize such an advantage, active coasting drive control (that is, control to charge energy by converting potential energy into electric energy by generating negative (−) torque of the motor without mechanical braking) according to an exemplary embodiment of the present disclosure may charge a battery supplying power to a driving motor of the environmentally friendly vehicle by using regenerative energy and follow a velocity of a deceleration target point through velocity control. For example, as illustrated in FIG. 1, the coast dive control according to the exemplary embodiment of the present disclosure may control (adjust) the velocity of the environmentally friendly vehicle from 70 km/h which is a current velocity to 50 km/h which is a target velocity in the deceleration event.

Figure 2:
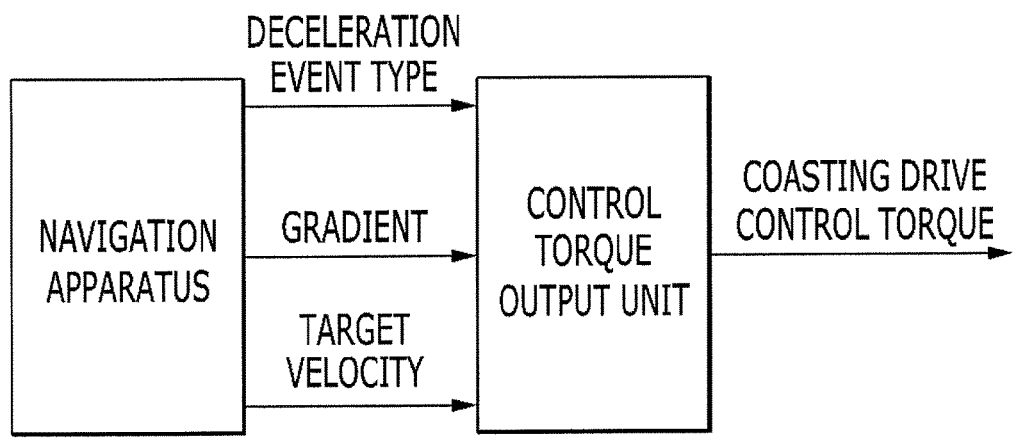
FIG. 2 (RELATED ART) is a block diagram for describing an apparatus for outputting coasting drive control torque on a downhill road in the related art.

FIG. 2 (RELATED ART) is a block diagram for describing an apparatus for outputting coasting drive control torque on a downhill road in the related art.

Referring to FIG. 2, a navigation apparatus that predicts event information in front of the vehicle provides to a control torque output unit a type of the downhill road, which is a type of the deceleration event, gradient information of the downhill road of the downhill road, and the target velocity of the vehicle at the deceleration target point. The control torque output unit including a map table including coast drive control torque depending on a type of the downhill road, a map table including coasting drive control torque depending on the gradient of the downhill road, and a map table including coasting drive control torque depending on the target velocity may output the control torque for the coasting drive of the vehicle based on the type of the downhill road, the gradient information of the downhill road, and the target velocity information.

However, the related art may increase manual computation due to a large number of map tables, thus making it difficult to secure control performance with a reference member which is consistent for each deceleration event.

Figure 3:
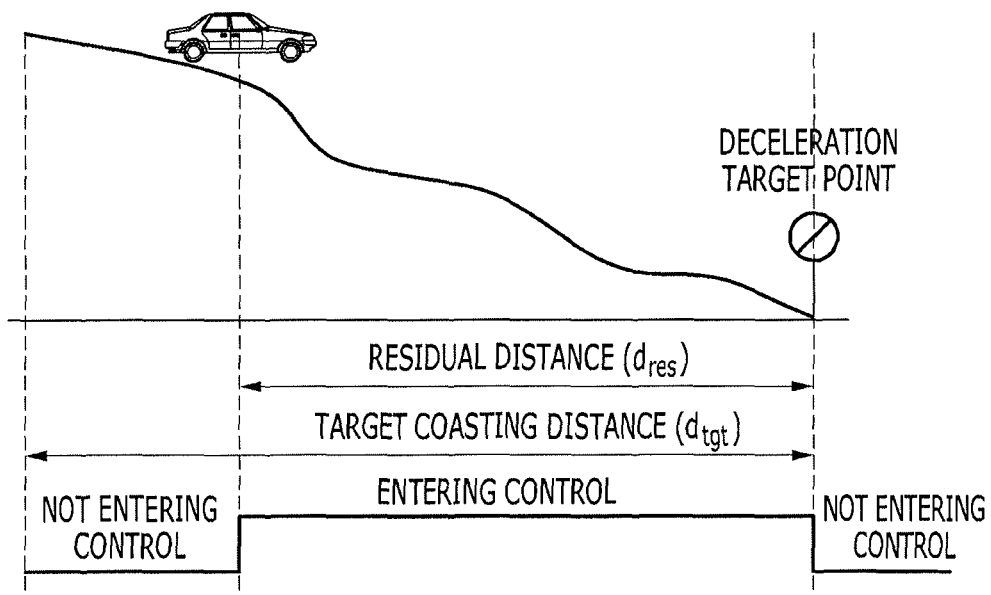
FIG. 3 is a schematic diagram for describing a method for controlling a coasting drive of an environmentally friendly vehicle according to an exemplary embodiment of the present disclosure.
Figure 4:
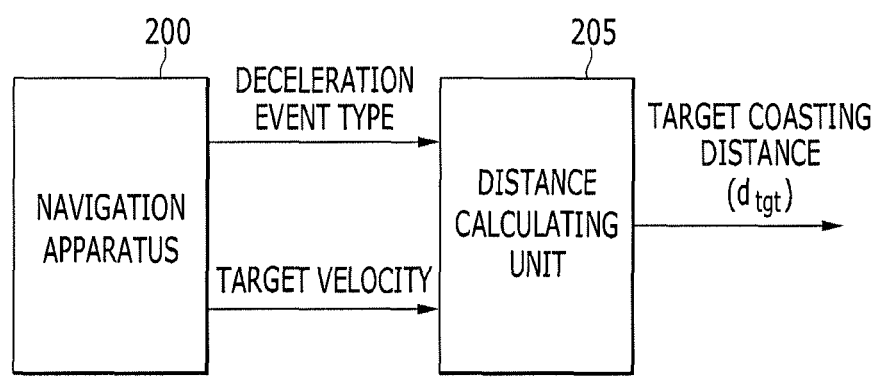
FIG. 4 is a block diagram for describing a distance calculating unit calculating a target coasting distance according to an exemplary embodiment of the present disclosure.
Figure 5:
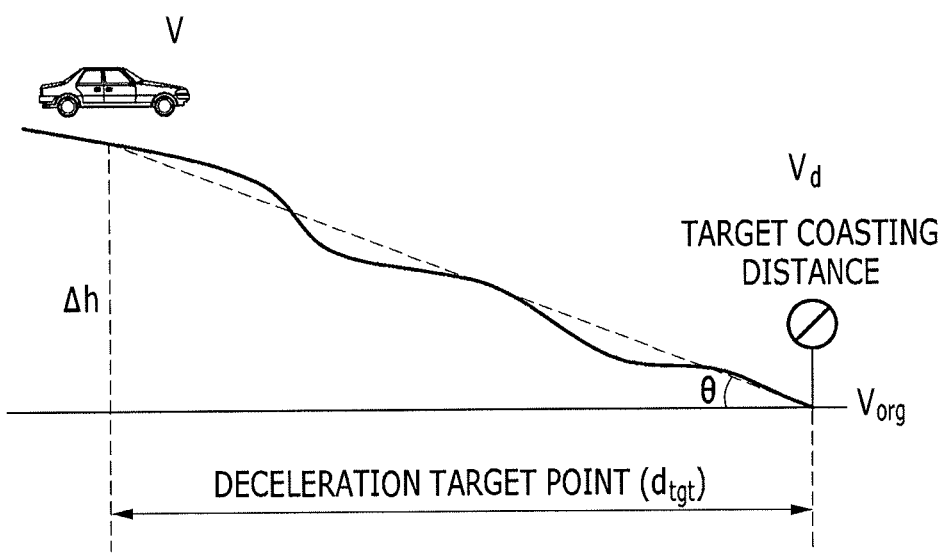
FIG. 5 is a schematic diagram for describing a method for predicting a coasting velocity of a deceleration target point according to an exemplary embodiment of the present disclosure.
Figure 6:
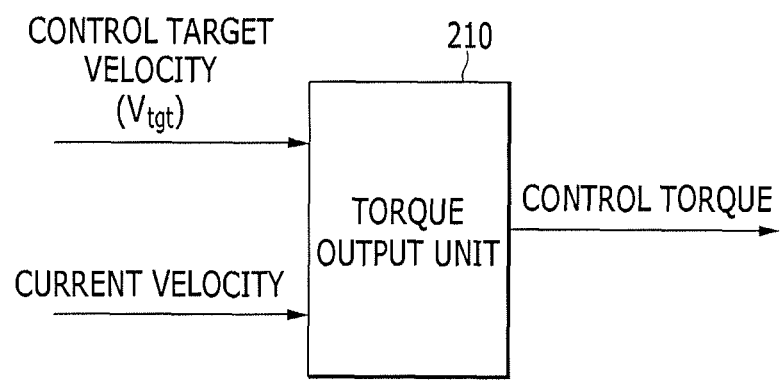
FIG. 6 is a block diagram for describing an output unit outputting control torque for a coasting drive according to an exemplary embodiment of the present disclosure.
Figure 7:
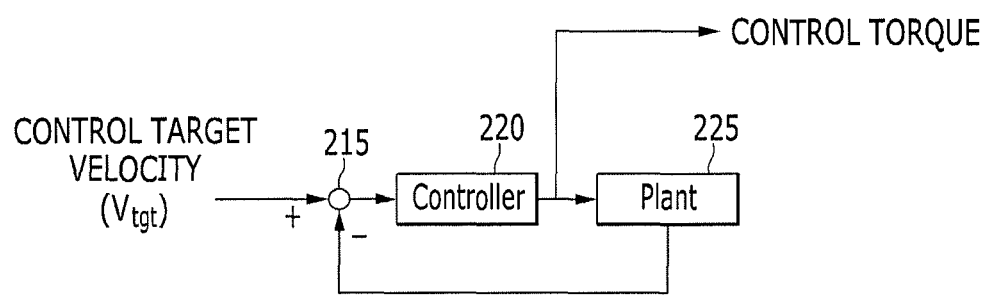
FIG. 7 is a block diagram for describing a control unit outputting control torque for a coasting drive according to another exemplary embodiment of the present disclosure.
Figure 8:
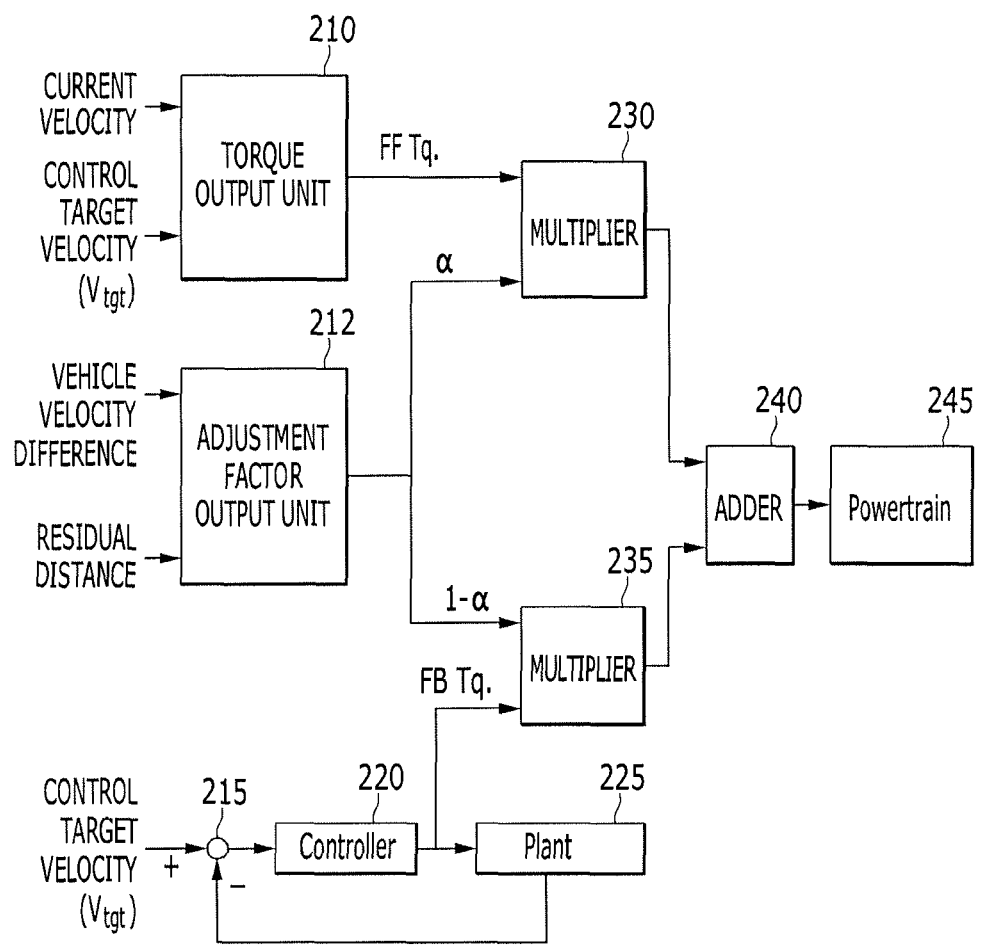
FIG. 8 is a block diagram for describing a torque output device final control torque according to an exemplary embodiment of the present disclosure.
Figure 9:
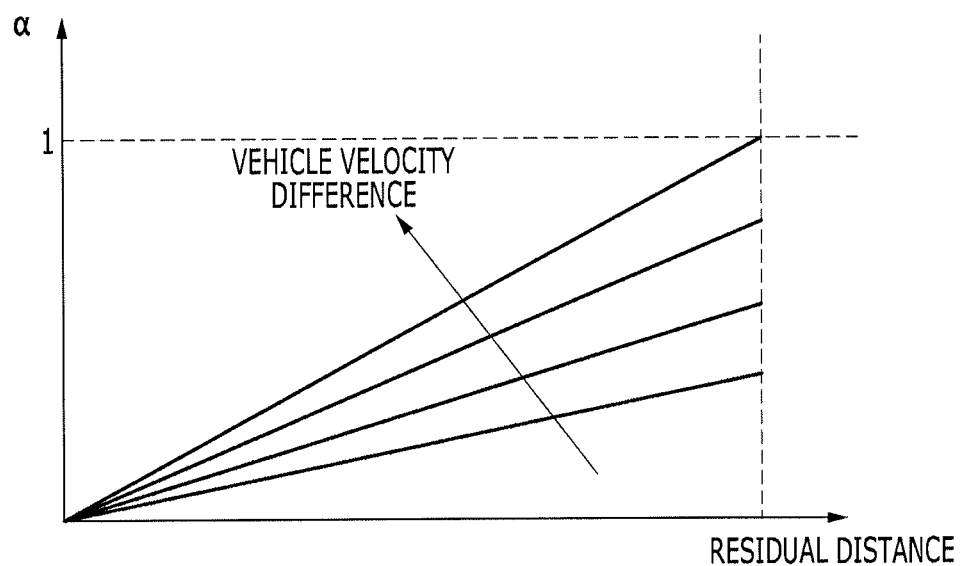
FIG. 9 is a graph for describing an adjustment factor output unit illustrated in FIG. 8.
Figure 10:
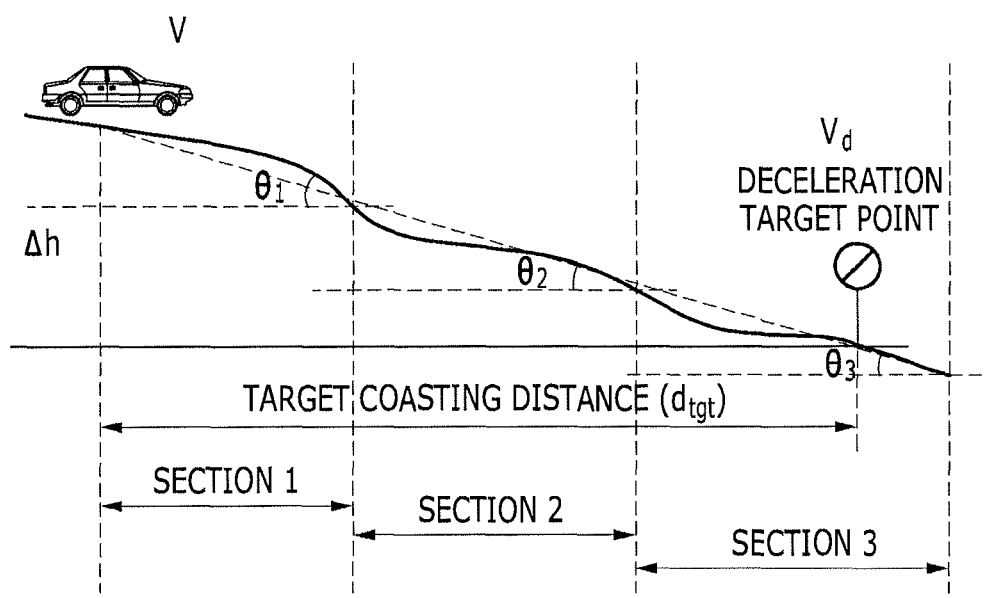
FIG. 10 is a schematic diagram for describing an exemplary embodiment of a method for calculating (determining) a gradient illustrated in FIG. 5.
Figure 11:
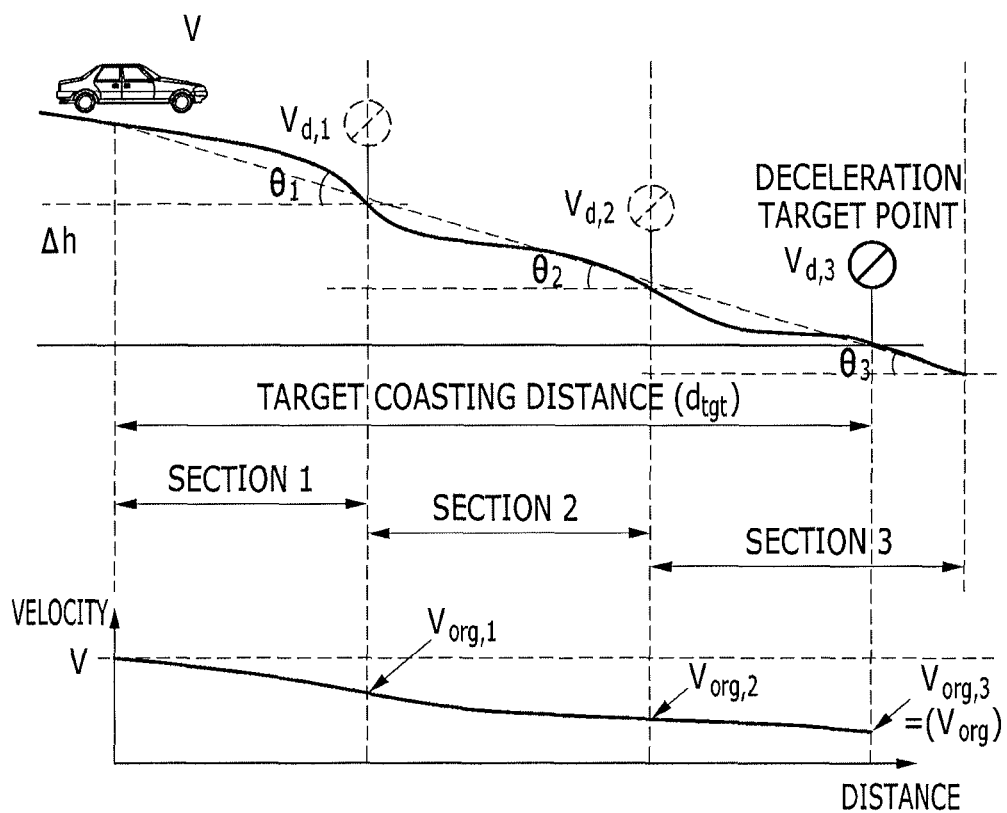
FIG. 11 is a schematic diagram for describing a method for predicting a coasting velocity for each section through using a gradient for each section illustrated in FIG. 10.
Figure 12:
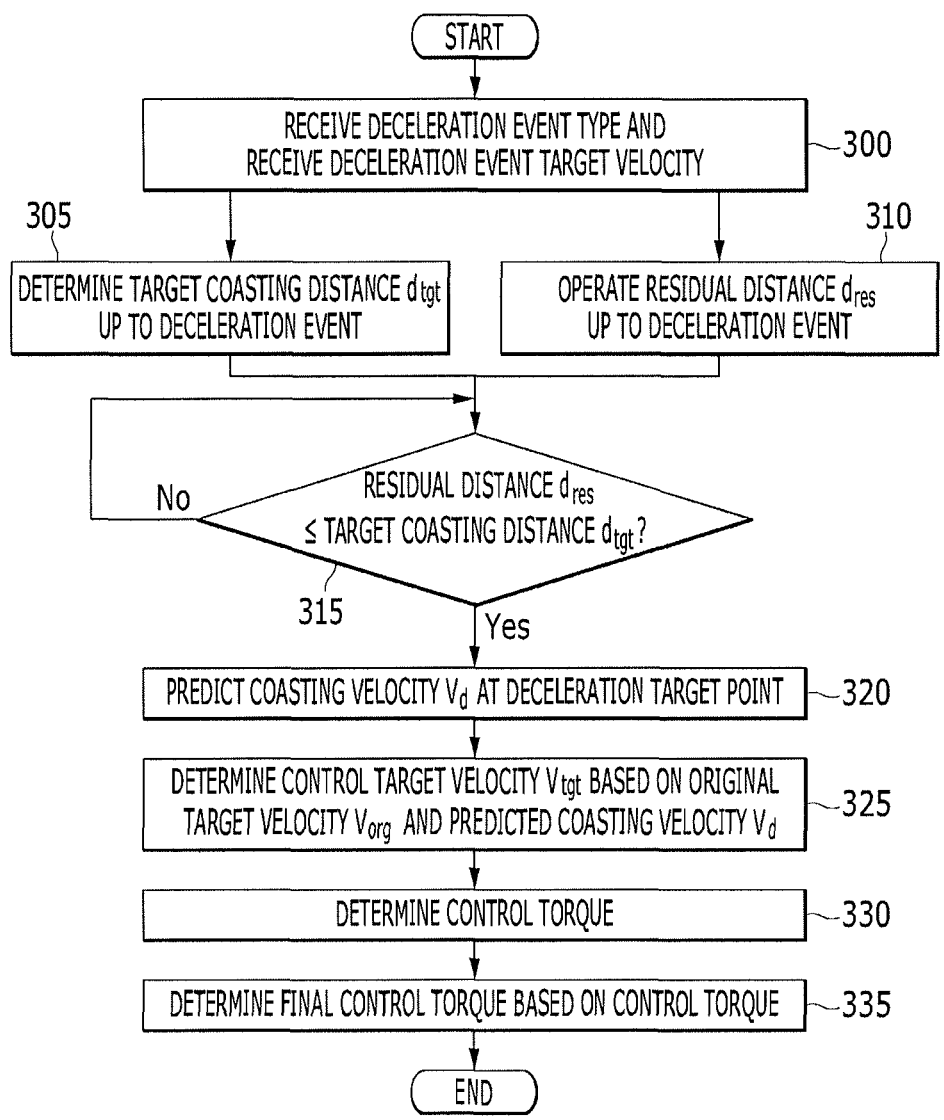
FIG. 12 is a flowchart for describing a method for controlling a coasting drive of an environmentally friendly vehicle according to an exemplary embodiment of the present disclosure.

FIG. 3 is a schematic diagram for describing a method for controlling a coasting drive of an environmentally friendly vehicle according to an exemplary embodiment of the present disclosure. FIG. 4 is a block diagram for describing a distance calculating unit calculating a target coasting distance according to an exemplary embodiment of the present disclosure. FIG. 5 is a schematic diagram for describing a method for predicting a coasting velocity of a deceleration target point according to an exemplary embodiment of the present disclosure. FIG. 6 is a block diagram for describing an output unit outputting control torque for a coasting drive according to an exemplary embodiment of the present disclosure. FIG. 7 is a block diagram for describing a control unit outputting control torque for a coasting drive according to another exemplary embodiment of the present disclosure. FIG. 8 is a block diagram for describing a torque output device final control torque according to an exemplary embodiment of the present disclosure. FIG. 9 is a graph for describing an adjustment factor output unit illustrated in FIG. 8. FIG. 10 is a schematic diagram for describing an exemplary embodiment of a method for calculating (determining) a gradient illustrated in FIG. 5. FIG. 11 is a schematic diagram for describing a method for predicting a coasting velocity for each section through using a gradient for each section illustrated in FIG. 10. FIG. 12 is a flowchart for describing a method for controlling a coasting drive of an environmentally friendly vehicle according to an exemplary embodiment of the present disclosure.

Referring to FIGS. 3 to 12, in a receiving step (300), a control unit 220 illustrated in FIG. 7 may receive from a navigation apparatus 200 illustrated in FIG. 4 the type of the deceleration event, the deceleration target velocity in the deceleration event, and the deceleration event information such as the gradient of the deceleration event (alternatively, road) and determine the deceleration target point (alternatively, a point at which the deceleration event is positioned). The control unit 220 may be, for example, one or more microprocessors which operate by a program or hardware including the microprocessors and the program may include a series of instructions for performing a method for controlling a coasting drive of an environmentally friendly vehicle according to an exemplary embodiment of the present disclosure, which is described below. The control unit 220 may control all operations of the environmentally friendly vehicle including the torque output device.

The navigation apparatus 200 may provide to the control unit 220 the deceleration event information by using positional information of a global positioning system (GPS), high-precision map information (alternatively, precise road map information), or real-time traffic information that is transmitted from a server disposed outside the vehicle. The precise road map may represent a three-dimensional (3D) map which has high accuracy information on the road and geographical features around the road.

The deceleration event information may include front deceleration information of the vehicle, which requires deceleration of the vehicle, such as toll gate information, interchange (IC) entry/outgoing information, velocity camera information, construction or accident situation information, or safety guidance information.

According to a calculation step (305), the control unit 220 may control the distance calculating unit 205 illustrated in FIG. 4 to calculate (determine) a target coasting distance $d_{tgt}$ up to the deceleration event depending on the type of the deceleration event, the deceleration target velocity, and the gradient of the road transmitted from the navigation apparatus 200. The target coasting distance may be a distance determined to maximally recover the regenerative energy.

According to an operation step (310), the control unit 220 may receive a residual distance up to the deceleration event from the navigation apparatus 200 or operate (calculate) a residual distance $d_{res}$ up to the deceleration event (alternatively, deceleration target point) based on the current velocity and the target velocity of the vehicle.

The calculation step (305) and the operation step (310) may be simultaneously performed or the calculation step (305) may be performed earlier than the operation step (310) or the operation step (310) may be performed earlier than the calculation operation (305).

According to a comparison step (315), the control unit 220 may determine whether the residual distance $d_{res}$ is equal to or less than the target coasting distance $d_{tgt}$. When the residual distance $d_{res}$ is equal to or less than the target coasting distance $d_{tgt}$, the coating drive control method of the environmentally friendly vehicle which is a process may proceed to a prediction step (320).

According to the prediction step (320), the control unit 220 may predict a coasting velocity $V_d$ at the deceleration target point.

Referring to FIG. 5, the method for predicting the coasting velocity of the deceleration target point according to the exemplary embodiment of the present disclosure is described below.

A relative altitude $\Delta h$ of the vehicle, which is determined by setting the target coasting driving distance $d_{tgt}$ is operated below.

$$\Delta h = d_{tgt} * \tan\theta$$

In the equation, $\theta$ represents the gradient of the deceleration target point. The relative altitude of the vehicle may be determined by the equation according to determination of the target coasting distance $d_{tgt}$ and the gradient of the deceleration target point.

Potential energy of the vehicle at a target coasting distance determination point is operated below.

$$E_P = m*g*\Delta h$$

Kinetic energy of the vehicle at the deceleration target point is operated below.

$$E_K = \tfrac{1}{2}*m*(V_d)^2 - \tfrac{1}{2}*m*(V)^2$$

In the equation, V represents the velocity at the target coasting distance determination point.

The coasting velocity $V_d$ predicted at the deceleration target point by using an energy equivalence law is operated below.

$$m*g*\Delta h = \tfrac{1}{2}*m*(V_d)^2 - \tfrac{1}{2}*m*(V)^2$$

$$V_d = \sqrt{V^2 + 2g\Delta h}$$

For example, when $d_{tgt}$=300 m, $\theta$=10 deg (=0.2625 rad), and V=70 kph (=19.4 mps), $\Delta h$=dtgt*tan$\theta$=300*tan(0.2625 rad)=53.04 m, and $$V_d = \sqrt{V^2 + 2g\Delta h} = \sqrt{(19.4)^2 + 2\times 9.8\times(53.04)} = 37.6 \text{ mps}$$
$$(=135 \text{ kph})$$

According to the calculation step (325), the control unit 220 may calculate (alternatively, determine) a control target velocity based on the target velocity of the vehicle at the deceleration event point and the calculated coasting velocity.

The control target velocity $V_{tgt}$ considering the coasting velocity $V_d$ at the predicted deceleration target point and the target velocity $V_{org}$ at the deceleration target point may be calculated (determined) below.

$$V_{tgt} = V_{org} + \Delta V$$

In the equation, $\Delta V = V - V_d$. In the equation, V may indicate an actual velocity before the environmentally friendly vehicle performs the coasting drive.

For example, as illustrated in FIG. 1, when $V_{org}$=50 kph, $V_d$=135 kph, and V=70 kph, $\Delta V = V - V_d$=70 kph−135 kph=−65 kph and $V_{tgt} = V_{org} + \Delta V$=50 kph−65 kph=−15 kph.

According to an output step (330), the control unit 220 may output the control torque to adjust the velocity of the vehicle to the target velocity based on the calculated control target velocity. The control unit 220 may control the control torque to be output to a powertrain 245 of the vehicle illustrated in FIG. 8.

Referring to FIG. 6, the output unit outputting control torque for the coasting drive according to the exemplary embodiment of the present disclosure is described below.

The control unit 220 may control the torque output unit 210 to output feed forward torque stored in a map table (e.g., a memory), which is control torque corresponding to the control target velocity $V_{tgt}$ and the current velocity of the vehicle. The torque output unit 210 may be a torque output unit of a feed forward scheme, which includes the map table. The map table may be generated by a test.

Referring to FIG. 7, the control unit outputting control torque for a coasting drive according to another exemplary embodiment of the present disclosure is described below.

The control unit 220 may output the control torque corresponding to the control target velocity $V_{tgt}$ by using a plant model 225 as a control target model and a subtractor 215. For example, the plant model 225 may be a vehicle model including the motor driving the environmentally friendly vehicle, and the like. When additionally described, the control unit 220 may output the feedback torque corresponding to the control torque based on a vehicle velocity difference which is a difference between the current velocity and the control target velocity of the environmentally friendly vehicle. The control unit 220 may be the feedback scheme torque output unit.

In another exemplary embodiment of the present disclosure, the method for controlling a coasting drive of an environmentally friendly vehicle may further include an output step (335).

According to the output step (335), the control unit 220 may calculate (alternatively, determine) output final control torque based on the feed forward torque and the feedback torque.

Referring to FIG. 8, the torque output device outputting the final control torque according the exemplary embodiment of the present disclosure is described below.

The torque output device includes a torque output unit 210, an adjustment factor output unit 212, a subtractor 215, a controller 220, the plant model 225 as the control target model, a multiplier 230, a multiplier 235, and an adder 240 as the final control torque output unit outputting the final control torque to the powertrain 245. The final control torque output unit may further include the multiplier 230 and the multiplier 235. The powertrain 245 may include the driving motor driving a driving wheel of the vehicle and the transmission. The powertrain may include the engine selectively driving the vehicle. For example, the plant model 225 may be a vehicle model including the motor driving the environmentally friendly vehicle, and the like.

The torque output device may perform map table based feed forward control (alternatively, open-loop control) at the time of initially entering the coasting drive control so as to minimize a difference in driver's deceleration feeling (alternatively, drivability) by a driver depending on a transient reaction (transient response) of the vehicle. However, due to a characteristic of the control, when a drive situation not included (alternatively, not considered) in the map table occurs, accuracy of the control may be reduced. In the drive situation in which a lot of disturbance occurs, real-time reflection of the drive situation through the feedback control is required. As a result, in the exemplary embodiment of the present disclosure, dual loop deceleration control depending on a rule (relationship) between the residual distance and the vehicle velocity is performed to increase accuracy in following the target velocity.

The torque output unit 210 may output the feed forward torque FF Tq. Stored in the map table, which corresponds to the current velocity of the vehicle and the control target velocity of the vehicle.

The control unit 220 may output the feedback torque FB Tq. corresponding to the control target velocity by using the plant model 225 and the subtractor 215. The control unit 220 may determine the feedback torque based on the plant model so as that the current velocity of the vehicle, which is output from the plant model 225 follows the target velocity.

Referring to FIGS. 8 and 9, the adjustment factor output unit 212 may output an adjustment factor α to adjust an application weight (application ratio) of the feed forward torque stored in the map table, which corresponds to the vehicle velocity difference and the residual distance. As the residual distance increases and the vehicle velocity difference increases, the weight (ratio) occupied by the feed forward torque in the coasting drive control torque may increase.

In order to achieve the control torque depending on occurrence of the deceleration event and maximize utilize the advantages of the feed forward (FF) control and the feedback (FB) control, the adjustment factor output unit 212 may adjust the application ratio of the feed forward (FF) torque and the feedback (FB) torque according to a feature (characteristic) of each control and the multiplier 230, the multiplier 235, and the adder 240 may output the final control torque for the coasting drive control of the vehicle to the powertrain 245. For example, the final control torque may be calculated by α*FF tq.+(1−α)*FB tq. The powertrain 245 may drive the vehicle (coasting drive) in response to the final control torque.

As described above, as the deceleration event occurs, the coasting drive control needs to be performed (progressed) by using the driving motor regardless of a will of the driver, and as a result, feed forward (FF) control to enable calibration by the test considering the drivability in a situation in which the drivability (driver's feeling) may be influenced and feedback (FB) control may be used for improvement of following precision at a distance close to the target velocity in the exemplary embodiment of the present disclosure. Therefore, in the exemplary embodiment of the present disclosure, when the deceleration event occurs, a current velocity of the vehicle may enter the control target velocity without influencing the drivability.

When additionally described, precise deceleration control of the vehicle may be implemented by approximately mixing the advantages of open-loop control and closed-loop control. That is, in the exemplary embodiment of the present disclosure, in a situation (case) in which the initial control entrance and initial control torque (deceleration torque) which may largely influence the drivability occurs, the feed forward control which is the map table based open-loop control may be performed so as to enable the calibration and in later control in which the control torque (deceleration torque) to be generated is small, but precise control is required, the feedback control which is closed-loop control may be performed. In the dual loop control according to the exemplary embodiment of the present disclosure, the difference between the target vehicle velocity and the current vehicle velocity may be reduced by starting with the feed forward (FF) control and as the deceleration event is approached, the feed forward (FF) control and the feedback (FB) control are used (mixed or overlapped) to determine the control torque according to the adjustment factor to determine the weights of the feed forward (FF) control and the feedback (FB) control. Further, more precise control may be required and the feedback (FB) control may be performed at a distance around the target point corresponding to the deceleration event.

Referring to FIG. 10, after the deceleration event is determined, the number of gradients given at the target coasting distance up to the deceleration event at the position of the current vehicle may be not one.

The control unit 220 may update (alternatively, restore) the gradient for each section whenever a gradient change (inflection point) over a specific value (a predetermined gradient change amount) is recognized within the deceleration event.

Like dotted lines of FIG. 10, the control unit 220 may calibrate the target velocity of the deceleration target point by using an average value of the following gradient given at a time (that is, a time when the control starts) of entering the target coasting distance.

$$\theta = \frac{\theta_1 + \theta_2 + \ldots + \theta_n}{n}$$

In the equation, $\theta_i (i=1, 2, 3, \ldots, n)$ may indicate the gradient for each section.

Referring to FIG. 11, when each environmentally friendly vehicle enters the deceleration event section, the control unit 220 may predict (calculate) coasting velocitys $V_{d,1}$, $V_{d,2}$, and $V_{d,3}$ of the respective sections. The target velocity $V_{org}$ at the deceleration target point and the vehicle velocity V at the control entrance time may be the same as the target velocity $V_{org}$ and the vehicle velocity V at the control entrance time described in association with FIG. 5.

The determination of the control target velocity for each section may be given by an equation given below.

$$V_{tgt,i} = V_{org,i} + \Delta V_i$$

In the equation, $\Delta V_i = V - V_{d,i}$, i=1, 2, 3, ..., n.

A component, "unit", or block or module used in the exemplary embodiment of the present disclosure may be implemented as software such as a task, a class, a sub routine, a process, an object, an execution thread, and a program performed in a predetermined area on the memory or hardware such as field programmable gate array (FPGA) or application-specific integrated circuit (ASIC) and further, may be achieved by combining the software and the hardware. The component or 'unit' may be included in a computer readable storage medium and some of the component or 'unit' may be dispersively distributed.

As described above, the exemplary embodiments are disclosed in the drawings and the specification. Herein, specific terms are used, but this is just used for the purpose of describing the present disclosure, but not used for limiting a meaning or restricting the scope of the present disclosure disclosed in the claims. Therefore, it will be appreciated by those skilled in the art that various modifications and exemplary embodiments equivalent thereto can be made therefrom. Accordingly, the true technical scope of the present disclosure should be defined by the technical spirit of the appended claims.

What is claimed is:

1. A method for controlling a coasting drive of an environmentally friendly vehicle, the method comprising:
    calculating, by a control unit, a coasting velocity of the environmentally friendly vehicle at a deceleration event point based on a target coasting distance up to the deceleration event point and a gradient at the deceleration event point;
    calculating, by the control unit, a control target velocity of the environmentally friendly vehicle based on a target velocity of the environmentally friendly vehicle at the deceleration event point and the calculated coasting velocity; and
    determining, by the control unit, control torque to adjust a velocity of the environmentally friendly vehicle to the target velocity to be output to a powertrain of the environmentally friendly vehicle based on the calculated control target velocity.

2. The method of claim 1, further comprising:
    determining, by the control unit, whether a residual distance up to the deceleration event point is equal to or less than the target coasting distance,
    wherein when the residual distance is equal to or less than the target coasting distance, calculating the coasting velocity of the environmentally friendly vehicle is performed.

3. The method of claim 1, further comprising:
    controlling, by the control unit, a distance calculating unit to calculate the target coasting distance based on the target coasting distance based on a type of a deceleration event, the target velocity, and a gradient transmitted from a navigation apparatus.

4. The method of claim 1, wherein the controlling of the control torque to be output to the powertrain of the vehicle includes:
    controlling, by the control unit, a torque output unit to output feed forward torque stored in a map table, which is the control torque corresponding to the control target velocity and the velocity of the environmentally friendly vehicle.

5. The method of claim 1, wherein the controlling of the control torque to be output to the powertrain of the vehicle includes:
    outputting, by the control unit, feedback torque corresponding to the control torque based on a vehicle velocity difference which is a difference between the velocity and the control target velocity of the environmentally friendly vehicle.

6. The method of claim 1, wherein the controlling of the control torque to be output to the powertrain of the vehicle includes:
    controlling, by the control unit, a torque output unit to output feed forward torque stored in a map table, which corresponds to the velocity of the environmentally friendly vehicle and the control target velocity,
    outputting, by the control unit, feedback torque corresponding to the control target velocity based on a vehicle velocity difference which is the difference between the velocity and the control target velocity,
    controlling, by the control unit, an adjustment factor output unit to adjust an application ratio of the feed forward torque stored in the map table, which corresponds to the vehicle velocity difference and the residual distance up to the deceleration event point, and
    controlling, by the control unit, a final control torque output unit to calculate final control torque corresponding to the control torque based on the output feed forward torque and the feedback torque and the adjusted application ratio and output the calculated final control torque to the powertrain.

7. The method of claim 6, wherein:
    in the case of an adjustment factor output by the adjustment factor output unit and to adjust the application ratio, as the residual distance increases and the vehicle difference increases, the application ratio of the feed forward torque increases.

8. The method of claim 6, wherein:
    the control unit controls the feed forward torque to be output before outputting the feedback torque based on the adjustment factor output by the adjustment factor output unit and to adjust the application ratio and controls the feed forward torque and the feedback torque to be mixed and used and thereafter, controls the feedback torque to be output when the vehicle approaches a position corresponding to the deceleration event.

9. The method of claim 6, wherein:
    the final control torque is calculated by an Equation: $\alpha * FF$ tq.$+(1-\alpha) * FB$ tq., wherein the $\alpha$ represents the adjustment factor output by the adjustment factor output unit and to adjust the application ratio, the FF tq. represents the feed forward torque, and the FB tq. represents the feedback torque.

10. A non-transitory computer readable medium containing program instructions executed by a processor, the computer readable medium comprising:
    program instructions that calculate a coasting velocity of an environmentally friendly vehicle at a deceleration event point based on a target coasting distance up to the deceleration event point and a gradient at the deceleration event point;
    program instructions that calculate a control target velocity of the environmentally friendly vehicle based on a target velocity of the environmentally friendly vehicle at the deceleration event point and the calculated coasting velocity; and program instructions that determine control torque to adjust a velocity of the environmentally friendly vehicle to the target velocity to be output to a powertrain of the environmentally friendly vehicle based on the calculated control target velocity.

* * * * *